(12) United States Patent
Morvant

(10) Patent No.: US 9,062,610 B2
(45) Date of Patent: Jun. 23, 2015

(54) EXHAUST CONE

(71) Applicant: ROLLS-ROYCE PLC, London (GB)

(72) Inventor: Romuald Morvant, Uttoxeter (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/108,799

(22) Filed: Dec. 17, 2013

(65) Prior Publication Data

US 2014/0209408 A1 Jul. 31, 2014

(51) Int. Cl.
| G10K 11/172 | (2006.01) |
| F02C 7/24 | (2006.01) |
| F02K 1/34 | (2006.01) |
| F02K 1/44 | (2006.01) |
| F02K 1/82 | (2006.01) |

(52) U.S. Cl.
CPC ... *F02C 7/24* (2013.01); *F02K 1/34* (2013.01); *F02K 1/44* (2013.01); *F02K 1/827* (2013.01)

(58) Field of Classification Search
CPC .... F02K 1/827; G10K 11/172; F05B 2260/96
USPC .......................................... 181/213, 292, 290
See application file for complete search history.

(56) References Cited

U.S. PATENT DOCUMENTS

| 4,064,961 | A | 12/1977 | Tseo |
| 4,137,992 | A | 2/1979 | Herman |
| 5,760,349 | A | 6/1998 | Borchers et al. |
| 5,997,985 | A * | 12/1999 | Clarke et al. .................. 428/116 |
| 6,203,656 | B1 | 3/2001 | Syed |
| 6,615,576 | B2 * | 9/2003 | Sheoran et al. ................. 60/39.5 |
| 6,935,834 | B2 | 8/2005 | Lata Perez |
| 7,246,481 | B2 * | 7/2007 | Gutmark et al. ................. 60/204 |
| 8,025,122 | B2 * | 9/2011 | Gilcreest et al. ............... 181/213 |
| 8,307,945 | B2 * | 11/2012 | Todorovic ...................... 181/213 |
| 8,479,877 | B2 * | 7/2013 | Todorovic ...................... 181/213 |
| 8,621,842 | B2 * | 1/2014 | Francisco et al. ............. 60/39.83 |
| 8,770,339 | B2 * | 7/2014 | Starobinski et al. ........... 181/213 |
| 2002/0079159 | A1* | 6/2002 | Liu ................................. 181/210 |
| 2007/0220894 | A1 | 9/2007 | Bouty et al. |
| 2007/0256889 | A1 | 11/2007 | Yu et al. |
| 2007/0272477 | A1 | 11/2007 | Vincet |
| 2008/0118699 | A1 | 5/2008 | Jumel |
| 2008/0223655 | A1 | 9/2008 | Peiffer et al. |
| 2008/0308345 | A1 | 12/2008 | Borchers et al. |
| 2010/0012423 | A1 | 1/2010 | Mercat |
| 2012/0006614 | A1 | 1/2012 | Todorovic |

OTHER PUBLICATIONS

May 2, 2013 British Search Report issued in British Application No. 1301702.5.

* cited by examiner

*Primary Examiner* — Forrest M Phillips
(74) *Attorney, Agent, or Firm* — Oliff PLC

(57) ABSTRACT

A gas turbine engine exhaust cone (40) comprising one or more acoustic absorption chambers (48), each chamber (48) comprising two side walls (50) and an acoustic attenuation wall (62). The side walls (50) define the circumferential extent of the chamber (48). The acoustic attenuation wall (62) has one or more acoustic attenuators (64) and is positioned circumferentially intermediate the side walls (50). The side walls (50) extend axially along the exhaust cone (40) at least one of them with a circumferential progression. The acoustic attenuation wall (62) extends axially along the exhaust cone (40) with or without a circumferential progression.

15 Claims, 4 Drawing Sheets

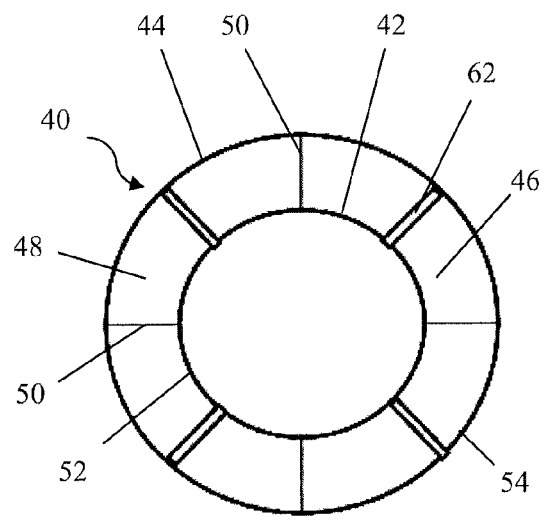
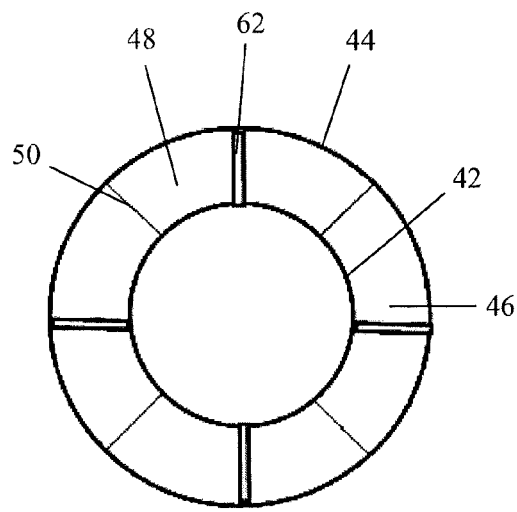
Figure 3a                Figure 3b
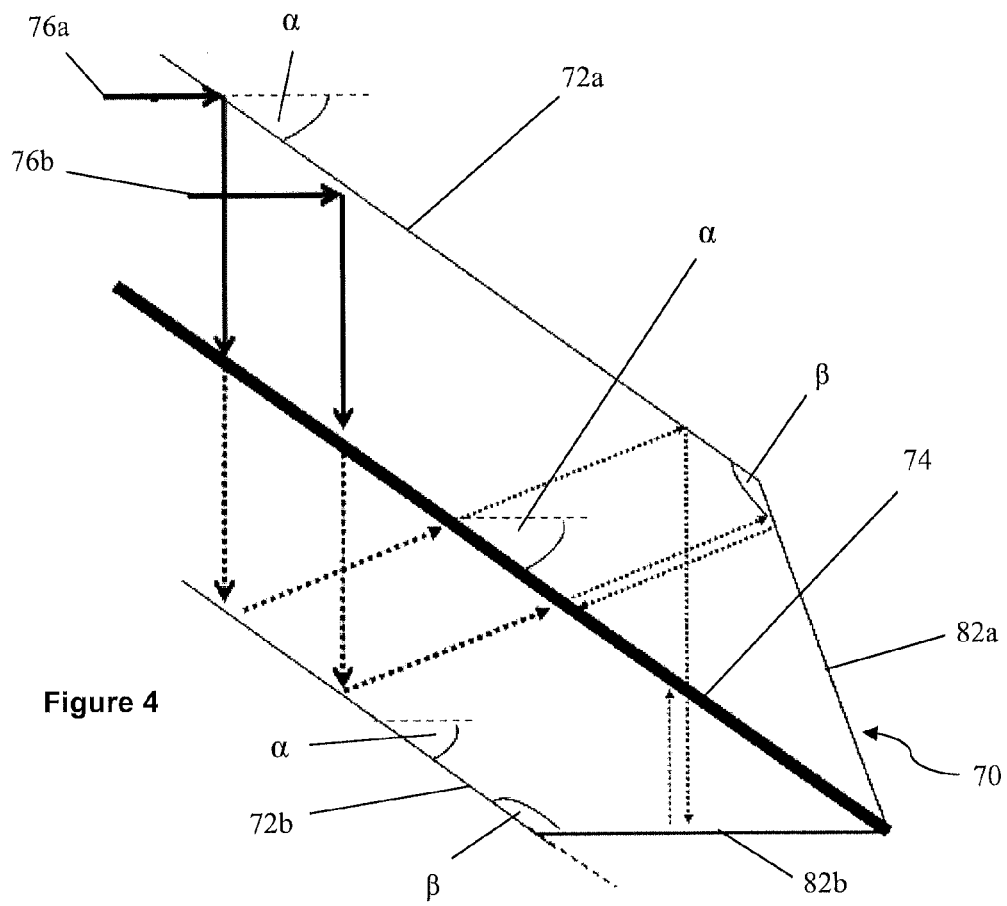
Figure 4

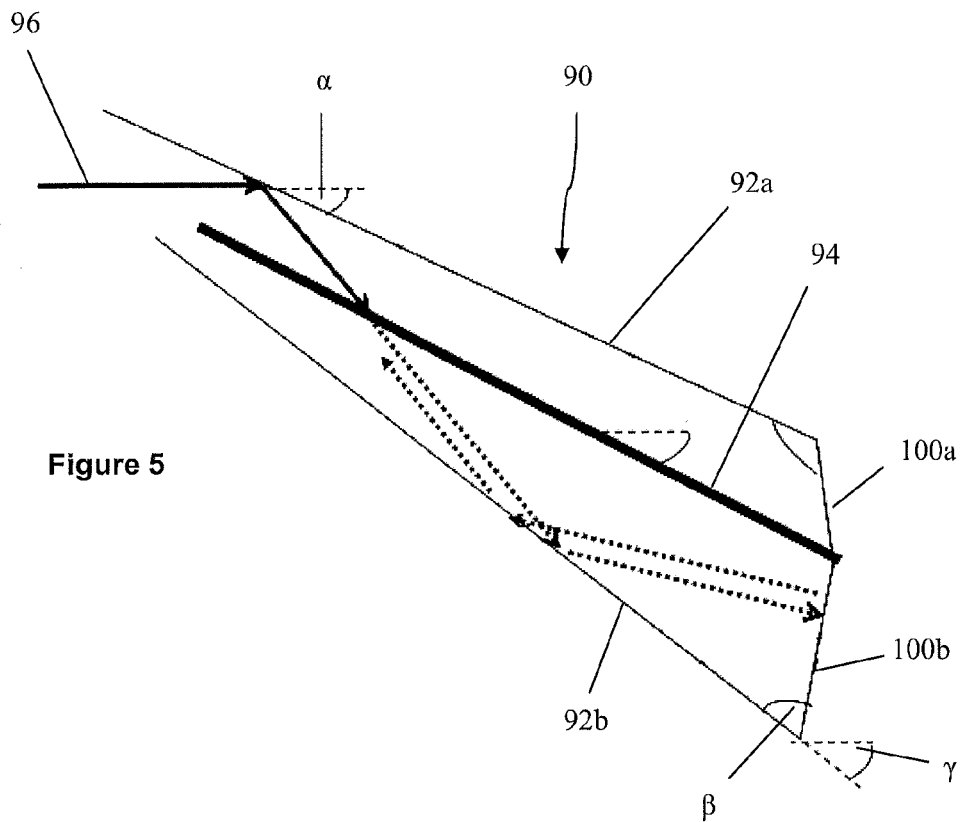
Figure 5
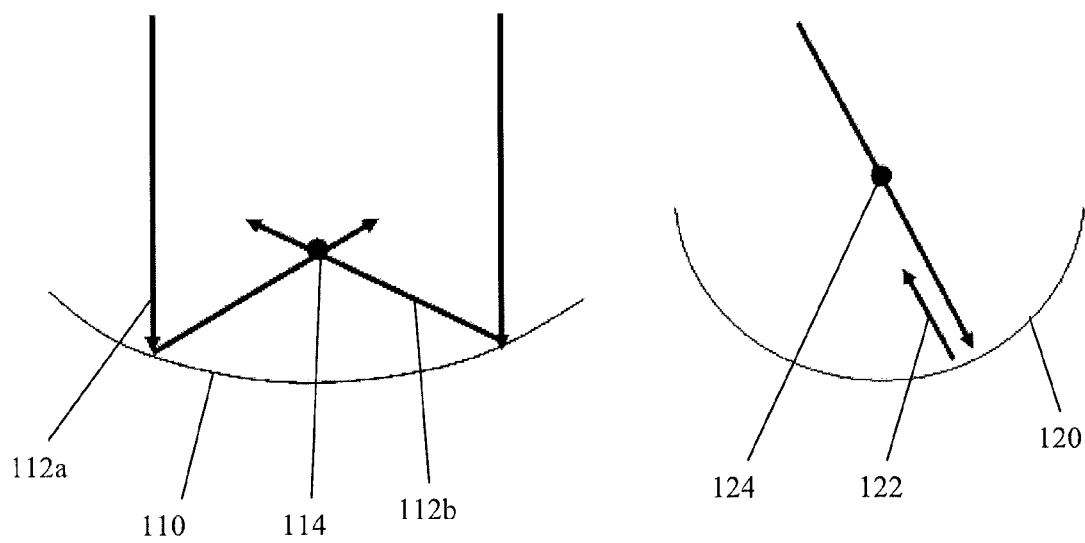
Figure 6a  Figure 6b

EXHAUST CONE

The present invention relates to gas turbine engines, gas turbine engine exhaust cones and acoustic absorption chambers. More specifically the invention relates to the absorption of acoustic waves produced by gas turbine engines and may have particular application in the absorption of low frequency broadband or tonal acoustic waves (between approximately 100-600 Hz) that may be produced by combustion. As will be appreciated however the invention is not limited to such applications.

Much of the noise generated by combustion and the turbines of a gas turbine engine travels axially out of the engine exhaust adjacent an exhaust cone. It is known to provide various acoustic absorbers in and around the exhaust cone with a view to suppressing a proportion of this noise.

One conventional method for absorbing acoustic waves at the exhaust cone is to provide a series of chambers within the cone itself. Planar modes of acoustic waves enter the chambers via acoustic inlet regions at the surface of the cone, propagate directly to an end wall of the chamber and are reflected there to pass back through the acoustic inlet region. The acoustic inlet regions are provided with acoustic attenuators which may absorb the waves when they enter and leave the chambers.

Absorption will be most effective for waves having a wavelength of half the wave propagation path length between passes through the attenuators. Half wavelength path lengths give the greatest statistical probability of the wave consistently meeting the attenuator at a maximum. Where the attenuator has a suitable impedance, the incident and reflected pressure waves may cancel each other. Consequently the length of the chamber is selected according to the specific frequency targeted. Where for example a high frequency (e.g. above 2000 Hz) short wavelength wave is to be absorbed, short, radially extending chambers may be provided. Where however low frequency (e.g. below 600 Hz) long wavelength waves are to be absorbed, long, axially extending chambers may be provided. Frequencies having a mid-range, may require either of these solutions depending on particular cone and engine architecture and/or other considerations. Prior art chambers target only a narrow range of frequencies as they have a fixed length.

If there is a desire to effectively absorb more than one acoustic frequency additional chambers are provided having different lengths. This may reduce the effectiveness of absorption at any particular frequency as the number of chambers targeting that frequency may be reduced. Further the additional chambers may add weight to the cone. It is further noteworthy that known designs seek only two passes of a relevant acoustic wave through the acoustic attenuators, limiting the number of absorption events that may occur and so effectiveness.

According to a first aspect of the invention there is provided a gas turbine engine exhaust cone optionally comprising one or more acoustic absorption chambers, each chamber optionally comprising two side walls and optionally an acoustic attenuation wall, the side walls optionally defining the circumferential extent of the chamber and the acoustic attenuation wall optionally having one or more acoustic attenuators and optionally being positioned circumferentially intermediate the side walls, where optionally the side walls extend axially along the exhaust cone optionally at least one of them with a circumferential progression and the acoustic attenuation wall optionally extends axially along the exhaust cone optionally with or without a circumferential progression.

With the arrangement described above the side walls may reflect acoustic waves in a direction whereby they may pass through the acoustic attenuation wall. In view of the provision of two side walls and an acoustic attenuation wall between them, acoustic waves may be trapped, reflecting at the side walls (which act as wave guides) and passing through the acoustic attenuation wall on multiple occasions. This may increase the effectiveness of absorption. The circumferential progression of at least one of the side walls (e.g. sloping circumferentially with axial progression) may mean that an acoustic wave travelling axially down the chamber may encounter a side wall, with the resultant reflection giving the wave a pseudo circumferential component to its propagation (a plane wave will not propagate in a curved path but can propagate between circumferentially spaced walls). Consequently additional passes through an intermediate acoustic attenuation wall may be achieved than with a direct propagation of the wave to an end wall of the chamber. The number of absorption events (passages through the acoustic attenuation wall) may be particularly effective where the acoustic attenuation wall has the same or a similar length of extension to the side walls.

Most reduction in noise may result from absorption events of plane waves at the acoustic attenuation wall. Nonetheless it is noteworthy that additional mechanisms may contribute. Where spiral waves meet the side walls, they may be forced to adopt higher order modes which may be more likely to be cut-off. Additionally scattering events which may occur will cause loses in energy and so contribution to noise reduction, especially where waves are 'trapped' and so reflect many times.

For convenience henceforth, features and/or arrangements which may be present in one, more or each chamber are discussed in relation to a single chamber. As will be appreciated this is not intended to be limiting.

In some embodiments both side walls extend axially along the exhaust cone with a circumferential progression.

In some embodiments the acoustic attenuation wall extends axially along the exhaust cone with a circumferential progression.

In some embodiments one or both of the side walls of the chamber is also a side wall for another chamber. This may increase the number of chambers that may be provided and reduce weight.

In some embodiments the chamber further comprises inner and outer walls defining the radial extent of the chamber.

In some embodiments the outer wall of the chamber is provided with one or more acoustic inlet regions arranged to allow the passage of acoustic waves into one or more of the chambers. These acoustic inlet regions may comprise perforations.

In some embodiments the acoustic inlet regions are provided with acoustic attenuators. This may result in additional absorption events to those that may occur at the acoustic attenuation wall.

In some embodiments the acoustic inlet region of the chamber is provided at a proximal end of the chamber which when the exhaust cone is in use corresponds to an upstream end of the chamber. This may promote additional absorption events as all or a large proportion of the chamber length may be used for reflection and absorption.

In some embodiments the inner and outer walls are part of internal and external walls of the exhaust cone respectively.

In some embodiments the chambers are disposed circumferentially forming an annulus between the interior and exterior walls of the exhaust cone.

In some embodiments the chamber further comprises one or more end walls closing the chamber at its distal end with respect to the acoustic inlet region. Reflections may occur at the end walls which may cause further passages of an acoustic wave through the acoustic attenuation wall.

In some embodiments the circumferential progression of one or both of the side walls and/or acoustic attenuation wall comprises a slope of fixed gradient between 10° and 45° to a plane passing through the wall and extending only axially with no circumferential progression. In this way the circumferential progression of one or both of the side walls and/or acoustic attenuation wall comprises a slope of fixed gradient between 10° and 45° to a plane defined by a centreline of the cone.

In some embodiments at least parts of the side walls are flat. Hard flat side walls may promote reflection (rather than absorption or scattering) and so trapping of acoustic waves.

In some embodiments the acoustic attenuators of the acoustic attenuation walls comprise one or more of:
a) Perforations through the acoustic attenuation wall;
b) Micro-perforations through the acoustic attenuation wall;
c) A porous region of the acoustic attenuation wall;
d) A meshed area of the acoustic attenuation wall;
e) A bulk absorber material;
f) A woven fabric;
g) An area of metal foam;
h) An area comprising honeycomb with perforated sheets at both sides.

In some embodiments the side walls and acoustic attenuation wall of the chamber are arranged so that assuming reflection at side walls, at least one wave propagation path is provided passing through the acoustic attenuation wall at least three times. Further the path length along the wave propagation path between each passage through the acoustic attenuation wall may be substantially equal to or a multiple of the shortest path length between acoustic attenuation wall passages.

Where path lengths between acoustic attenuation wall passages are the same, there is potential for multiple effective absorption events of an acoustic wave having a wavelength of double these path lengths. As will be appreciated the chamber may also be arranged such that the same path length for the wave propagation path exists between the acoustic inlet region and the first and/or last passage through the acoustic attenuation wall. It should also be noted that the wave propagation path may also pass through the acoustic attenuation wall on more occasions than three occasions e.g. four, five, six, seven, eight or more.

In some embodiments the shortest path length along the wave propagation path between acoustic attenuation wall passages is selected to be approximately half the wavelength of acoustic waves targeted for absorption or a multiple thereof. The shortest path length may for example be within one eighth of a target wavelength of half the wavelength, or within one sixteenth, or within one thirty second, or within one sixty fourth.

In some embodiments the side walls and acoustic attenuation wall of the chamber are arranged so that there are two or more such wave propagation paths. Additional wave propagation paths may mean additional wave passages through the acoustic attenuation wall and improved absorption.

In some embodiments at least some of the different wave propagation paths target absorption of different acoustic wavelengths, each wave propagation path passing through the acoustic attenuation wall at least three times and having path lengths along the wave propagation path between each passage through the acoustic attenuation wall equal to half the wavelength of acoustic waves targeted for absorption or a multiple thereof. In this way a single chamber may be optimised for the absorption of more than one frequency and may therefore be capable of absorbing broadband noise rather than tonal noise only.

In some embodiments the acoustic attenuators intersecting wave propagation paths are tailored to absorption of acoustic waves of the wavelength corresponding to that targeted along that wave propagation path. By tailoring the impedance of the attenuators, waves of a particular wavelength may be absorbed more effectively. Different impedances may therefore be used in different parts of the acoustic attenuation wall, with impedances being matched to wave propagation paths in terms of the wavelength targeted. In some embodiments the acoustic attenuation wall may also have regions optimised to cause increased scattering.

In some embodiments at least one of the wave propagation paths incorporates at least one reflection at the inner and/or outer wall of the chamber. Where relatively low frequency acoustic waves are targeted and/or the diameter of the exhaust cone is relatively small, it may be necessary to provide chambers that have a large circumferential extent (e.g. one quarter or one half of an annulus of chambers) in order to meet the half wavelength criteria. In that case a direct wave propagation path between two side walls may be less likely or impossible. The use of the inner and/or outer walls to complement the side walls as wave guides may therefore be advantageous.

In some embodiments at least one of the wave propagation paths incorporates at least one reflection at one, more or all of the end walls of the chamber.

In some embodiments the end walls are arranged to cause reflection of a wave back along its wave propagation path incident towards the end walls. This may enhance predictability of the wave propagation path and may ensure that a wave propagation path optimised in the incident direction is also optimised for the return direction (including for example optimised acoustic attenuators).

In some embodiments the side walls and acoustic attenuation wall of the chamber are parallel. This may create multiple wave propagation paths targeting the same frequency of acoustic waves (e.g. path length between acoustic attenuation wall passages equal to half the wavelength of the target frequency). Such a cavity may be particularly efficient at absorbing the target frequency as it may create multiple wave propagation paths along which multiple intersections with the acoustic attenuation wall occur.

In some embodiments the side walls of the chamber are parallel and the acoustic attenuation wall is non-parallel with the side walls. This may allow for different acoustic frequencies to be effectively targeted by the single chamber, although it may not be possible to maintain a consistent path length along a wave propagation path between acoustic attenuation wall passages.

In some embodiments the side walls of the chamber are non-parallel. In this case different wave propagation paths will have different path lengths between acoustic attenuation wall passages. By way of example the side walls may converge or diverge in the axial direction. In that case, if two acoustic waves with the same angle of incidence strike the same side wall at axially separated locations and reflect, the path length between acoustic attenuation wall passages experienced by each wave would be different. Additionally or alternatively the side walls may diverge or converge in the radial direction. In that case, if two acoustic waves with the same angle of incidence strike the same side wall at radially separated locations and reflect, the path length between acoustic attenuation wall passages experienced by each wave would be different. The use of non-parallel side walls may allow the cavity to effectively target absorption of different acoustic frequencies.

In some embodiments at least one chamber has a single end wall comprising a concave spherical wall and concave parabolic walls extending between the concave spherical wall and the side, inner and outer walls, where the centre of the sphere defining the spherical wall and the focus of the parabolic walls coincide at a single point. If a wave incident towards the end wall travels parallel to the axis of symmetry of the parabolic wall and reflects at it, the wave will pass through the focal point of the parabola. If it then reflects at the spherical wall it will pass back through the focal point and return along the incident wave propagation path (in the opposite direction).

In some embodiments one or more inner cavities are provided radially inwards of the chambers with at least one inner acoustic inlet region arranged to allow the passage of acoustic waves into one or more of the inner cavities being provided in the inner wall of at least one chamber. The inner cavities may have any of the characteristics of the chambers. Alternatively the inner cavities may define wave propagation paths in the radial direction. The second degree of freedom provided by the inner cavities may allow for attenuation of very different frequencies (e.g. mid to high frequencies in the range 600-5000 Hz).

In some embodiments the each inner cavity may be provided with one or more acoustic attenuation walls.

In some embodiments the acoustic inlet regions of the chambers and the inner acoustic inlet regions of the inner cavities are radially miss-aligned. In this way acoustic waves exiting the inner cavities via the inner acoustic inlet regions are less likely to pass directly out of the chambers. In this way they may be more likely to be trapped and absorbed and/or scattered.

In some embodiments inner cavities of different radial extents are provided. Additionally or alternatively the radial extent of cavity may vary circumferentially. It may be for example that an inner cavity has an area of greatest radial extent on an opposite side of the exhaust cone to an area of minimum radial extent, with a smooth gradient in radial extent between the two areas.

According to a second aspect of the invention there is provided an acoustic absorption chamber in accordance with the first aspect of the invention.

According to a third aspect of the invention there is provided a gas turbine engine provided with an exhaust cone according to the first aspect of the invention.

The skilled person will appreciate that a feature described in relation to any one of the above aspects of the invention may be applied mutatis mutandis to any other aspect of the invention.

Embodiments of the invention will now be described by way of example only, with reference to the Figures, in which:

FIG. 3a is a cross-sectional view at a first axial position through a gas turbine engine exhaust cone according to an embodiment of the invention;

FIG. 3b is a cross-sectional view at a second axial position through a gas turbine engine exhaust cone according to an embodiment of the invention;

FIG. 4 is a schematic view indicating an exemplary acoustic wave propagation path occurring in a gas turbine engine exhaust cone according to an embodiment of the invention;

FIG. 5 is a schematic view indicating an exemplary acoustic wave propagation path occurring in a gas turbine engine exhaust cone according to an embodiment of the invention;

FIG. 6a is a schematic view indicating acoustic wave reflection at a parabolic surface;

FIG. 6b is a schematic view indicating acoustic wave reflection at a spherical surface;

Figure 1:
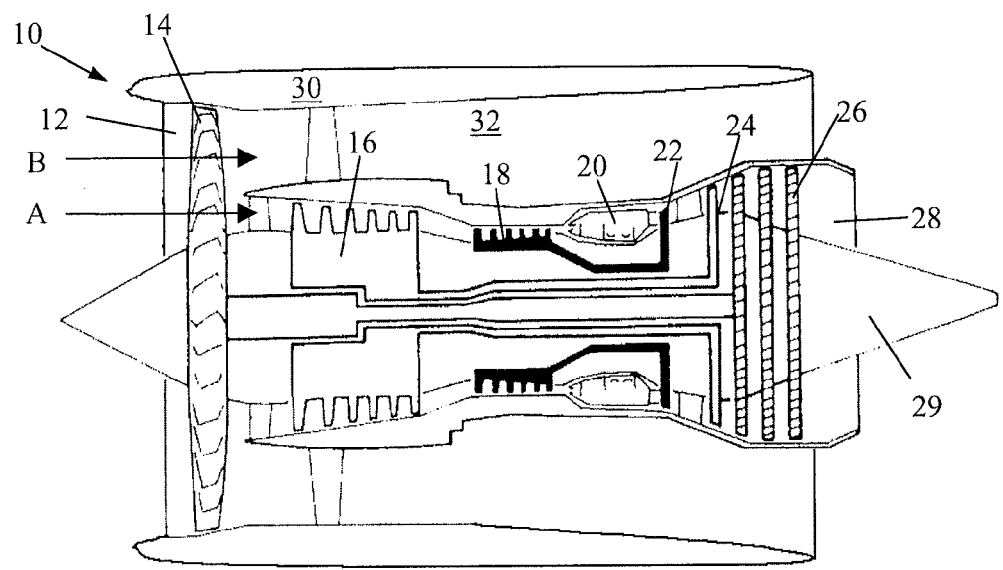
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26, an exhaust nozzle 28 and an exhaust cone 29. A nacelle 30 surrounds the gas turbine engine 10 and defines, in axial flow B, a bypass duct 32.

Figure 2:
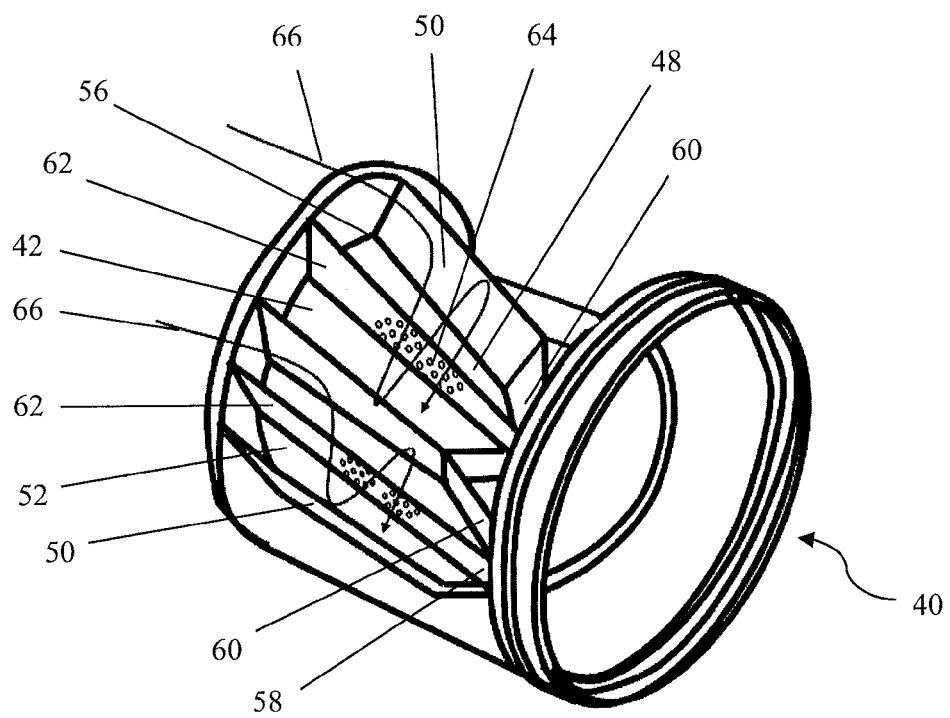
FIG. 2 is a cut-away schematic view showing a portion of a gas turbine engine exhaust cone according to an embodiment of the invention.

Referring now to FIGS. 2, 3a and 3b part of a gas turbine engine exhaust cone is generally shown at 40. The exhaust cone 40 has internal 42 and external 44 walls (see FIGS. 3a and 3b) which extend axially and define an annulus 46 between them. Positioned inside the annulus 46 is a plurality of acoustic absorption chambers 48.

Each acoustic absorption chamber 48 is defined by a pair of side walls 50 and inner 52 and outer 54 walls. The inner 52 and outer 54 walls are in this case portions of the internal 42 and external 44 walls of the cone 40 respectively. The inner 52 and outer 54 walls define the radial extent of the chamber 48. Each outer wall 54 is provided with an acoustic inlet region (not shown) in the form of perforations positioned at a proximal end 56 (axially upstream) of each chamber 48. The acoustic inlet regions (not shown) are provided with acoustic attenuators (not shown).

The side walls 50 span the inner 52 and outer 54 walls and extend both axially (along the length of the cone 40) and with a circumferential progression. The circumferential progression can be seen in FIGS. 3a and 3b, which show cross-sections at different axial points along the cone 40 and consequently the side walls 50 appearing at different circumferential positions. The circumferential progression means that when viewed from an upstream position, a face of each side wall 50 is visible and provides a slope or ramp. The side walls 50 define the circumferential extent of each chamber 48.

At a distal end 58 (axially downstream) of each chamber 48 are two end walls 60. The end walls 60 close the chamber 48 at its distal end 58 and therefore define its axial extent in the downstream direction. Each of the end walls 60 extends from and is angled to a respective one of the side walls 50.

Intermediate (and in this case equidistant) each side wall 50 is an acoustic attenuation wall 62. Like the side wall 50, each acoustic attenuation wall 62 extends axially along the cone 40 with a circumferential progression. The acoustic attenuation wall 62 terminates at the end walls 60. At various locations along the acoustic attenuation wall 62 acoustic attenuators 64 are provided.

In use an acoustic wave 66 having a particular frequency may travel axially downstream the engine and enter the chamber 48 through its acoustic inlet region. Some of the wave 66 may be absorbed by the acoustic attenuators associated with the acoustic inlet region.

Thereafter the wave 66 follows a wave propagation path within the chamber 48 and may initially continue to travel axially. Due to the circumferential progression of the side walls 50, the wave 66 would then encounter a side wall 50 and especially where the encounter occurs at maximum amplitude for the wave 66, it may be reflected by the side wall 50 towards the acoustic attenuation wall 62.

The side walls 50 are hard and flat, therefore making reflection more likely. When the wave 66 encounters the acoustic attenuation wall 62 at least some of it may be absorbed by the acoustic attenuator 64 and some of it may continue beyond the acoustic attenuation wall 62.

Thereafter the wave 66 may be incident on the other side wall 50 of the chamber 48 where it may be reflected towards a further passage through the acoustic attenuation wall 62.

This pattern may be repeated until the wave 66 is incident on (and may be reflected from) at least one of the end walls 60. Where the wave 66 is reflected from at least one of the end walls 60 it may once again be incident on one of the side walls 50 or the acoustic attenuation wall 62, and multiple additional passages through the acoustic attenuation wall 62 may therefore occur before the exit of any remainder of the wave 60 via the acoustic inlet region.

Absorption for a particular frequency of wave 66 will be best where the path length between encounters with the acoustic attenuation wall 62 is equal to half the wavelength of the wave 66. Consequently in the embodiment of FIG. 2, the wave propagation path followed by the wave 66 is such that the incident path length between the acoustic inlet region and the first acoustic attenuation wall passage is equal to half the wavelength of waves 66 having a targeted frequency. Further the remaining passages through the acoustic attenuation wall 62 along the wave propagation path occur at intervals corresponding to half the wavelength of the targeted frequency. In this embodiment the wave propagation path includes reflection of the wave 66 at one of the end walls 60 in such a way that it travels the previously travelled path in the opposite direction. The path lengths mentioned above are achieved by selecting the separations, lengths and relative orientations of the side walls 50, acoustic attenuation wall 62, inner wall 52, outer wall 54 and/or end walls 60 accordingly. In order that passages through the acoustic attenuation wall 62 may be more effective, the acoustic attenuators of the acoustic attenuation wall 62 that are present at the location of an acoustic attenuation wall 62 passage along the wave propagation path have impedance tailored to absorption of waves 66 having the target frequency. Direct reflection of the wave 66 at the end wall 60 may increase the effectiveness of this tailoring as the wave 66 will pass through the tailored acoustic attenuators again.

As can be seen with reference to FIGS. 3a and 3b a direct wave propagation path between the side walls 50 is less likely to occur than an indirect wave propagation path in which additional reflection events occur at the inner 52 and/or outer 54 walls. This is due to the relatively small number of chambers 48 provided. The small number of chambers 48 may be desirable, especially where lower frequency waves are targeted, since larger path lengths between acoustic attenuation wall 62 passages may be required. Therefore intended wave propagation paths may deliberately incorporate reflection events at the inner 52 and/or outer 54 walls with the desired path length between acoustic attenuation wall 62 passages being nonetheless maintained.

Generally the number of chambers provided 48 may be determined in accordance with the radius of the cone 40, the frequency of acoustic waves targeted for absorption and/or the desirability/necessity of direct wave propagation paths between the side walls 50 and/or a side wall 50 and the acoustic attenuation wall 62.

Although in the embodiments of FIGS. 3a and 3b the separation between side walls 50 and acoustic attenuation walls 62 stay constant along the radial extent of the cone 40, the side walls 50 and acoustic attenuation walls 62 are not parallel because they diverge with increasing radial extent. Further consideration to the relative orientations of the side walls 50 and acoustic attenuation walls 62 is given below.

Referring now to FIG. 4 a schematic view is shown to illustrate the significance of a chamber (generally provided at 70) having two parallel side walls 72a and 72b and a parallel acoustic attenuation wall 74, where both the side walls 72a, 72b and acoustic attenuation wall 74 extend axially and with a circumferential progression.

Two wave propagation paths 76a and 76b are shown. Both wave propagation paths 76a, 76b reflect first at side wall 72a at different axial positions (or 'depths') but with the same acute angle of incidence a and consequently the same reflected angle. Both wave propagation paths 76a, 76b then meet the acoustic attenuation wall 74, with some absorption and some transmission occurring. Thereafter additional reflections events at the side walls 72a, 72b and acoustic attenuation wall 74 passages occur along both wave propagation paths 76a, 76b. There is also a reflection at one of a pair of end walls 82a and 82b along each wave propagation path 76a, 76b. Both reflections at the end walls 82a, 82b result in the wave propagation path 76a, 76b following its previous course but in the opposite direction. In this embodiment this is achieved by selecting an end wall angle β that each end wall 82a, 82b makes with the respective side wall 72a, 72b according to the formula β=180−α.

As a result of the parallel nature of side walls 72a, 72b and acoustic attenuation wall 74, the path length between acoustic attenuation wall 74 passages is the same for both wave propagation paths 76a, 76b despite the depth difference at which their respective first side wall 72a, 72b reflections occur. This means that the chamber 70 targets a narrow range of frequencies with a relatively large number of wave propagation paths. The above does not take into account any differences in path length that occur as a result of reflection at respective end walls 82a, 82b, but these reflections may also be controlled to maintain the path length similarity between the two wave propagation paths 76a, 76b. Consistent path lengths between acoustic attenuation wall 74 passages may also be maintained along each wave propagation path and may be extended to the path length between the acoustic inlet region and the first and/or last passage through the acoustic attenuation wall 74.

Referring now to FIG. 5 a schematic view is shown to illustrate the significance of a chamber (generally provided at 90) having two non-parallel side walls 92a and 92b and an acoustic attenuation wall 94 which is non-parallel to either side wall 92a, 92b, where both the side walls 92a, 92b and acoustic attenuation wall 94 extend axially and with a circumferential progression. In this instance the side walls 92a, 92b are non-parallel because they diverge in an axial direction (the separation between the side walls 92a, 92b being less at a proximal end of the chamber 90 than at its distal end).

A wave propagation path 96 is shown. The wave propagation path 96 reflects first at side wall 92a with an acute angle of incidence a. The wave propagation path 96 then meets an acoustic attenuation wall 94, with some absorption and some transmission occurring. Thereafter a reflection at side wall 92b is followed by reflection at one of a pair of end walls 100a and 100b. The reflection at the end wall 100b results in the wave propagation path 96 following its previous course but in the opposite direction. This reflection is achieved by selecting an end wall angle β that end wall 100b makes with side wall 92b according to the formula β=90+γ−2α, where γ is the acute angle the wave propagation path would have made with the side wall 92b if the first reflection had been there.

As a result of the non-parallel nature of side walls 92a, 92b and acoustic attenuation wall 94 the path length between acoustic attenuation wall 94 passages for wave propagation paths having first reflection events at different axial positions ('depths') will be different. This means that the chamber 90 targets a broader range of frequencies than chamber 70. Consistent path lengths between acoustic attenuation wall 94 passages may be maintained along each wave propagation path 96 (especially where there are only two side wall 92a, 92b reflections before an end wall 100a, 100b reflection). This consistency may also be extended to include the path length between the acoustic inlet region (with associated acoustic attenuators) and the first and/or last passage through the acoustic attenuation wall 90.

Referring now to FIG. 6a, a concave parabolic surface is generally shown at 110. Two wave propagation paths 112a and 112b reflect at the concave parabolic surface 110 and then pass through a focus 114 of the parabolic surface 110. Any wave incident on the parabolic surface 110 and travelling parallel to its axis of symmetry will be reflected through the focus 114.

Referring now to FIG. 6b, a concave spherical surface is generally shown at 120. A wave propagation path 122 reflects at the spherical concave surface 120 and then passes through a centre 124 of a sphere which defines the concave spherical surface 120. Any wave incident on the spherical surface 120 and travelling through the centre 124 will be reflected back through the centre 124.

Figure 7:
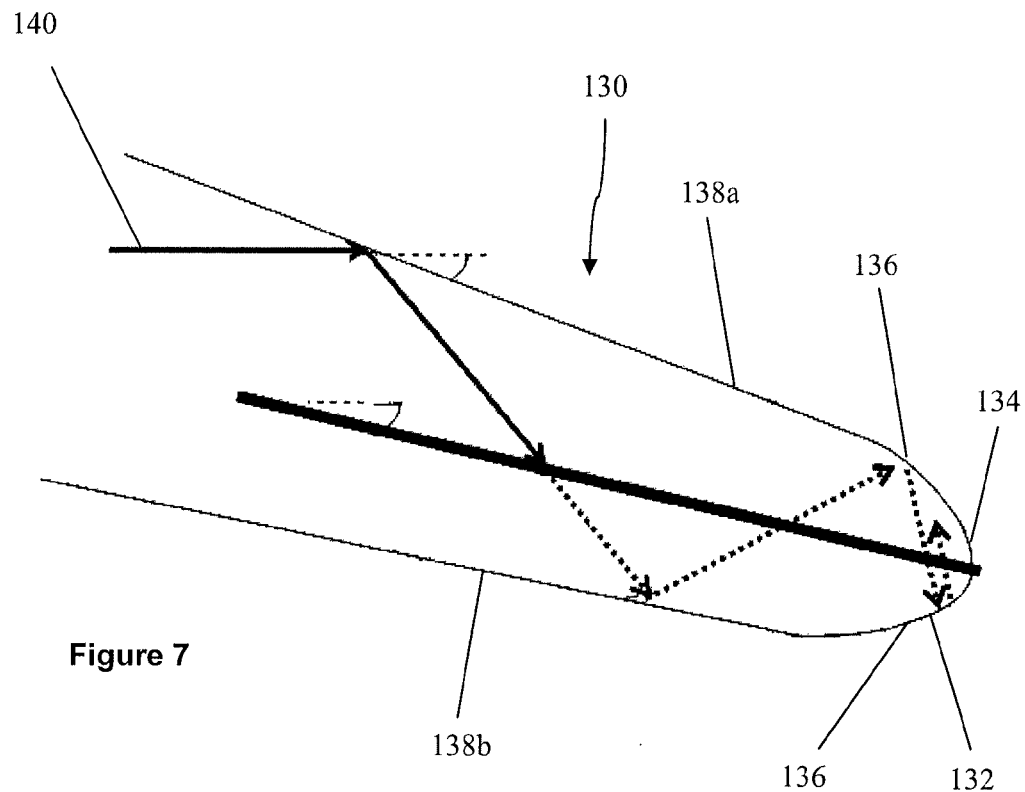
FIG. 7 is a schematic view indicating an exemplary acoustic wave propagation path occurring in a gas turbine engine exhaust cone according to an embodiment of the invention.

Referring now to FIG. 7 the significance of concave parabolic surfaces 110 and concave spherical surfaces 120 in terms of controlling wave propagation paths may be better understood. A chamber 130 is shown having an end wall 132. The end wall 132 has a concave spherical wall 134 and concave parabolic walls 136 extending between the concave spherical wall 134 and side 138a and 138b, inner (not shown) and outer (not shown) walls. Further the centre of the sphere defining the spherical wall 134 and the focus of the parabolic walls 136 coincide at a single point.

If (as shown) a wave 140 travels parallel to the axis of symmetry of the parabolic wall 136 and reflects at it, the wave 140 will pass through the focal point of the parabola. If it then reflects at the spherical wall 134 it will pass back through the focal point and return along the wave propagation path in the opposite direction. The combined use of parabolic and spherical walls may therefore allow control of reflection, and in particular reflection at an end wall to return a wave along its wave incoming wave propagation path in the opposite direction. As will be appreciated this may allow additional acoustic attenuation wall passages at locations tailored to absorption of the particular wave frequency in question and with inter-acoustic attenuation wall passage path lengths equal to half the wavelength of the wave (being the same paths as those travelled by the incoming wave).

Figure 8:
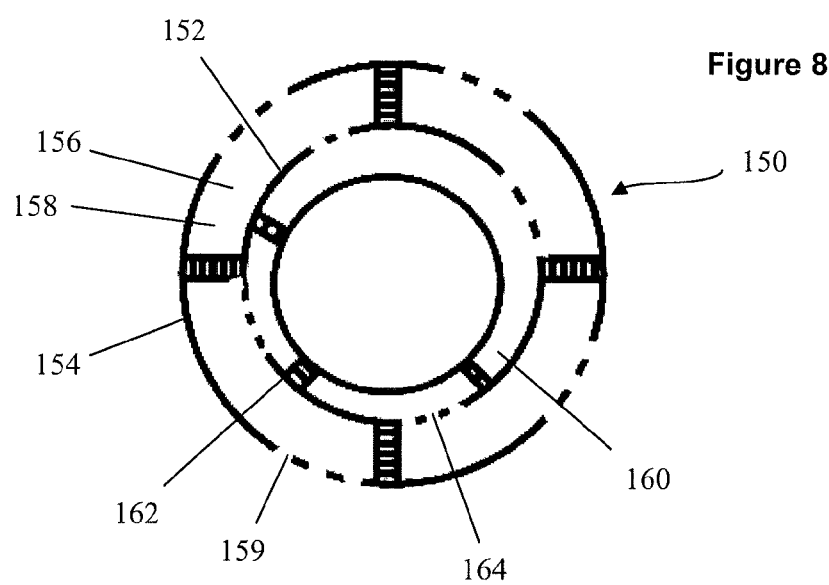
FIG. 8 is a cross-section through a gas turbine engine exhaust cone according to an embodiment of the invention.

Referring now to FIG. 8, a cross-section through a gas turbine engine exhaust cone is generally shown at 150. The cone 150 is similar to that shown in FIGS. 3a and 3b in that it has internal 152 and external 154 walls which extend axially and define an annulus 156 between them. Positioned inside the annulus are a plurality of acoustic absorption chambers 158, with access for acoustic waves into the chambers 158 provided by acoustic inlet regions 159 in the external wall 154. The cone 150 is however also provided with an inner cavity 160 provided radially inwards of the chambers 158. The inner cavity 160 comprises three acoustic attenuation walls 162. The acoustic attenuation walls 162 are circumferentially separated, span the radial extent of the inner cavity 160 and extend in the axial direction. The internal wall 152 is provided with a series of inner acoustic inlet regions 164 arranged to allow the passage of acoustic waves into the inner cavity 160. The inner acoustic inlet regions 164 are radially misaligned with respect to the acoustic inlet regions 159. Further the radial extent of the inner cavity 160 varies circumferentially.

The mechanism by which acoustic waves impinge on the acoustic attenuation wall 162 may vary according to specific embodiments. In this instance however it is envisaged that acoustic waves passing into the inner cavity 160 via the inner acoustic inlet regions 164 will propagate with both radial and circumferential components to their motion, potentially thereby reflecting at the walls of the cavity 160 at least until passing through an acoustic attenuation wall 162.

By provision of the inner cavity 160 acoustic frequencies in addition to those targeted by the chambers 158 may be absorbed. In particular the path length between acoustic attenuation wall 162 passages in the inner cavity 160 may be considerably different to the equivalent occurring in a chamber 158. By way of example the chambers may be tailored to target relatively low frequencies (approximately 100-600 Hz), whereas the cavity may be arranged to target mid to high frequencies (e.g. in the range 600-5000 Hz). The circumferential variation of the inner cavity 160 radial extent may allow targeting of a wider range of frequencies (due to path length variation around the circumference).

The misalignment of the inner acoustic inlet regions 164 and acoustic inlet regions 159 may mean that acoustic waves exiting the inner cavities via the inner acoustic inlet regions are less likely to pass directly out of the chambers. In this way they may be more likely to be trapped (possibly entering and exiting the inner cavity 160 on multiple occasions) and absorbed and/or scattered.

As will be appreciated, the discussion of wave propagation paths and propagation above has been in the context of plane waves. Nonetheless combustion noise from gas turbine engines typically further comprises spiral waves which propagate circumferentially as well as axially. Embodiments of the invention may also be advantageous in absorbing spiral waves. Spiral waves may be reflected at the side walls and absorbed by the acoustic attenuation walls. If the path length travelled by the spiral wave between acoustic attenuation wall passages corresponds to half its wavelength absorption of the spiral wave may be particularly effective. Further upon encountering a side wall, spiral waves may be restricted to lower order modes of oscillation and propagation, which may be more easily absorbed. In some embodiments, one or more acoustic attenuation walls may have one or more regions tailored to the absorption of spiral waves.

It will be understood that the invention is not limited to the embodiments above-described and various modifications and improvements can be made without departing from the various concepts described herein. Any of the features may be employed separately or in combination with any other features and the invention extends to and includes all combinations and sub-combinations of one or more features described herein in any form of gas turbine engine exhaust cone.

The invention claimed is:

1. A gas turbine engine exhaust cone comprising one or more acoustic absorption chambers, each chamber comprising two side walls and an acoustic attenuation wall, the side walls defining the circumferential extent of the chamber and the acoustic attenuation wall having one or more acoustic attenuators and being positioned circumferentially intermediate the side walls, where the side walls extend axially along the exhaust cone at least one of them with a circumferential progression and the acoustic attenuation wall extends axially along the exhaust cone with or without a circumferential progression, where the side walls are imperforate, and where the acoustic attenuation wall is substantially parallel to the side walls.

2. A gas turbine engine exhaust cone according to claim 1 where the chamber further comprises inner and outer walls defining the radial extent of the chamber.

3. A gas turbine engine exhaust cone according to claim 1 where the chamber further comprises one or more end walls closing the chamber at its distal end.

4. A gas turbine engine exhaust cone according to claim 3 where the side walls and acoustic attenuation wall of the chamber are arranged so that assuming reflection at side walls, at least one wave propagation path is provided passing through the acoustic attenuation wall at least three times and where the path length along the wave propagation path between each passage through the acoustic attenuation wall is substantially equal to or a multiple of the shortest path length between acoustic attenuation wall passages.

5. A gas turbine engine exhaust cone according to claim 4 where the side walls and acoustic attenuation wall of the chamber are arranged so that there are two or more such wave propagation paths.

6. A gas turbine engine exhaust cone according to claim 5 where at least some of the different wave propagation paths target absorption of different acoustic wavelengths, each wave propagation path passing through the acoustic attenuation wall at least three times and having path lengths along the wave propagation path between each passage through the acoustic attenuation wall equal to half the wavelength of acoustic waves targeted for absorption or a multiple thereof.

7. A gas turbine engine exhaust cone according to claim 4 where the acoustic attenuators intersecting wave propagation paths are tailored to absorption of acoustic waves of the wavelength corresponding to that targeted along that wave propagation path.

8. A gas turbine engine exhaust cone according to claim 4 where at least one of the wave propagation paths incorporates at least one reflection at one, more or all of the end walls of the chamber.

9. A gas turbine engine exhaust cone according to claim 8 where the end walls are arranged to cause reflection of a wave back along its wave propagation path incident towards the end walls.

10. A gas turbine engine exhaust cone according to claim 1 where the side walls and acoustic attenuation wall of the chamber are parallel.

11. A gas turbine engine exhaust cone according to claim 1 where the side walls of the chamber are non-parallel.

12. A gas turbine engine exhaust cone according to claim 3 where at least one chamber has a single end wall comprising a concave spherical wall and concave parabolic walls extending between the concave spherical wall and the side, inner and outer walls, where the centre of the sphere defining the spherical wall and the focus of the parabolic walls coincide at a single point.

13. A gas turbine engine exhaust cone according to claim 1 where one or more inner cavities are provided radially inwards of the chambers with at least one inner acoustic inlet region arranged to allow the passage of acoustic waves into one or more of the inner cavities being provided in the inner wall of at least one chamber.

14. An acoustic absorption chamber in accordance with claim 1.

15. A gas turbine engine provided with an exhaust cone according to claim 1.

* * * * *